(12) United States Patent
Darmawaskita

(10) Patent No.: US 6,456,044 B1
(45) Date of Patent: *Sep. 24, 2002

(54) MICROCONTROLLER WITH INTEGRAL SWITCH MODE POWER SUPPLY CONTROLLER

(75) Inventor: Hartono Darmawaskita, Chandler, AZ (US)

(73) Assignee: Microchip Technology Incorported, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/773,439

(22) Filed: Jan. 31, 2001

Related U.S. Application Data (63) Continuation-in-part of application No. 09/250,756, filed on Feb. 16, 1999, now Pat. No. 6,184,659.

(51) Int. Cl.$^7$ .................................................. H02J 7/04
(52) U.S. Cl. ........................................ 320/139; 320/137
(58) Field of Search ............................... 320/139, 137, 320/141, 127, 129

(56) References Cited

U.S. PATENT DOCUMENTS 5,751,139 A * 5/1998 Jordan et al. ............... 323/222
5,789,903 A * 8/1998 Young et al. ................ 320/161
5,945,806 A * 8/1999 Faulk .......................... 320/127
6,184,659 B1 * 2/2001 Darmawaskita ............. 320/139

* cited by examiner

Primary Examiner—Gregory J. Toatley, Jr.
Assistant Examiner—Lawrence Luk
(74) Attorney, Agent, or Firm—Baker Botts L.L.P.

(57) ABSTRACT

A single integrated circuit package for controlling the charging circuits of a battery charger. The single integrated circuit package comprises a microcontroller, switch mode power supply controller(s), analog to digital converter and analog input multiplexer which may be fabricated on a single integrated circuit die, or the microcontroller may be on one integrated circuit die, and the remaining aforementioned circuits may be on a second integrated circuit die. The switch mode power supply controller is adapted for connection to a power converter which is used to control the voltage and/or current to a battery being charged. The power converter may also be on the same integrated circuit die as the switch mode power supply controller, or may be on a separate semiconductor die but included in the single integrated circuit package. Single or multiple batteries may be charged using charging algorithms specifically tailored to each battery. Batteries being charged may have a different capacity, voltage, or chemistry type. State of charge and time to reach a fully charged condition for each battery may also be different.

29 Claims, 7 Drawing Sheets

MICROCONTROLLER WITH INTEGRAL SWITCH MODE POWER SUPPLY CONTROLLER

This application is a CIP of Ser. No. 09/250,756 on Feb. 16, 1999 now is U.S. Pat. No. 6,184,659.

BACKGROUND OF THE INVENTION

The invention relates to microcontrollers, and more particularly, to a microcontroller having an integral switch mode power supply controller for controlling the charging circuits of a battery charger.

Description of the Related Technology

A rechargeable battery requires periodic recharging during its useful life. There are many different types, sizes and capacities of batteries. Each type, size and/or capacity of rechargeable batteries may require a different charging algorithm. The appropriate charging algorithm may be determined by the battery manufacturer. These charging algorithms may be implemented with an intelligent battery charger. The intelligent battery charger may be comprised of a microcontroller, a switch mode power supply (SMPS) controller, a power converter circuit, and a feedback circuit for the battery voltage and/or current (depending on battery type and design requirements).

The microcontroller functions as the intelligence of the charger. Some of the functions performed by the microcontroller are: timing, testing presence of a battery, enabling and controlling the set points to the SMPS controller, performing the battery designer's proprietary charging algorithm, etc.

The SMPS controller is typically implemented using a general purpose SMPS controller integrated circuit (IC). The SMPS controller IC is designed to generate a constant voltage or constant current to the load. In many lower cost battery chargers, the designer may choose to implement the SMPS controller functions using voltage comparator(s). The SMPS controller module (either the general purpose SMPS controller IC or the simple voltage comparator implementation) may require input(s) to enable/disable the module output, and to change the output voltage/current set points. The SMPS controller module has circuitry to sense signals representing the load (battery) voltage and current, and produces an output signal to drive the power converter circuit. This drive signal is typically in the form of a switched on/off signal, which may employ one of the following techniques: pulse-width modulation, pulse-position modulation, pulse-skipping modulation, etc. The SMPS controller accepts the control signal(s) from the microcontroller, and produces the proper signal/pulses to drive the power converter circuit(s), and makes the attempt to control the feedback voltages (representing the load voltage and/or current of the battery).

The power converter circuit typically comprises discrete power semiconductor devices to handle the high voltage and/or current provided to the load (battery), and a transformer if electrical isolation is required.

The design and implementation of an intelligent battery charger requires multiple integrated circuits (ICs) for the microcontroller, SMPS controller(s), an analog-to-digital converter (ADC), and an analog input multiplexer. The necessity for a plurality of ICs and other discrete components increase the cost, complexity and un-reliability of the intelligent battery charger. What is needed is a more cost effective, simple and reliable system, method and apparatus for designing and implementing the circuitry for an intelligent battery charger.

SUMMARY OF THE INVENTION

The invention overcomes the above-identified problems as well as other shortcomings and deficiencies of existing technologies by providing in a single integrated circuit package a battery charger logic and control comprising a microcontroller, a switch mode power supply (SMPS) controller(s), an analog-to-digital converter (ADC) and an analog input multiplexer. The microcontroller, SMPS controller(s), ADC and analog input multiplexer may be fabricated on a single integrated circuit die, or the microcontroller may be on one integrated circuit die, and the remaining aforementioned circuits may be on a second integrated circuit die. Either the single or dual die implementations of the invention may be contained within a single integrated circuit package. This package may be one of the low cost integrated circuit packages for economy to a high reliability package meeting military standards.

For use with lower power batteries, a power converter may be included on the single die or two dice embodiments. Typically for the two dice embodiment, the power converter would be included on the same die as the SMPS controller. Another embodiment of the invention may include a third die comprising high power transistors for the power converter. The single die or two dice embodiments described herein may be packaged with this power transistor die in a high power hybrid integrated circuit package.

In either the single die or two dice embodiments of the invention, the microcontroller reads charge condition value(s) of a battery. The condition value(s) is detected by an analog to digital converter, or if more than one condition value is required, an analog input multiplexer in combination with the analog to digital converter may be used. The analog to digital converter converts the analog condition value(s) of the battery into digital representations of the battery condition value(s) for use by the microcontroller.

The SMPS controller has at least one analog input which is adapted to receive a parameter signal(s) from the power converter. The parameter signal(s) may be battery current and/or voltage, and depending on the charging algorithm, either or both parameter signal(s) may be utilized by the SMPS controller. A setpoint signal(s) is sent to the SMPS controller from the microcontroller. The setpoint signal(s) may change depending on the elapsed charge time, temperature, current, and/or voltage of the battery pursuant to the battery's charging algorithm. The setpoint signal(s) may be current and/or voltage, and depending on the charging algorithm, either or both may be sent from the microprocessor to the SMPS controller. The SMPS controller has an output which may be a repetition of on/off pulses used to drive the power transistor circuits of a power converter. These on/off pulses may be, for example but not limitation, pulse width, pulse position, or pulse skipping modulation.

Typically, the power converter is made up of discrete semiconductor power devices designed to handle the relatively large voltage and current requirements of the battery. The power converter may include a linear or switching power supply, including an isolation transformer if required, and power transistor(s) to control the amount of voltage and/or current being applied to the battery during its charge cycle. Also contemplated and with the scope of the invention, the power converter may be in the same integrated circuit package as described above.

The SMPS controller in conjunction with the power converter controls the charging profile of the battery according to a battery charging algorithm. The SMPS controller receives the parameter signal(s) (battery current and/or voltage) from the power converter and tries to match this parameter signal(s) to an associated setpoint(s) from the microcontroller. For example in a closed loop charger system, if the parameter signal is representative of the current drawn by the charging battery, then a desired current setpoint from the microcontroller will cause the SMPS controller to increase its pulse output duty cycle when the battery charging current is less than the desired current setpoint value, or to decrease the pulse output duty cycle when the battery charging current is greater than the desired current setpoint value. Voltage to the charging battery may be controlled in the same fashion. Thus the SMPS controller may have a constant voltage (CV) mode, a constant current (CC) mode, or constant voltage with current compliance (CVCC) mode.

The microcontroller in conjunction with the analog to digital converter (ADC) and the analog input multiplexer (if more than one analog input in needed) also may sense condition values from the battery being charged. These condition values may be charging voltage and current, battery temperature, etc. The microcontroller uses these condition values in conjunction with a programmed charging algorithm(s) in determining the setpoint(s) that the microcontroller sends to the SMPS controller.

Embodiments of the invention may include, without limitation thereto: 1) A single battery charger logic and control, comprising: a microcontroller, an analog to digital converter and an SMPS controller adapted for connection to a power converter and charging battery. 2) A multiple battery charger logic and control with sequential or alternating charging of at least two batteries, comprising: a microcontroller, an analog to digital converter, an analog multiplexer and at least two SMPS controllers adapted for connection to a power converter, a power transfer switch and two charging batteries. 3) A multiple battery charger logic and control with simultaneous charging of at least two batteries comprising a microcontroller, an analog to digital converter, an analog multiplexer and at least two SMPS controllers adapted for connection to at least two power converters and at least two charging batteries. Any of the aforementioned combinations, 1)–3), may also include the power converter either on the same die as the SMPS controller or on a separate power transistor die included in a hybrid power integrated circuit package.

A charger logic and control for charging a plurality of batteries having different capacities, voltages, and/or chemistry types are contemplated and within the scope of the invention. The plurality of batteries may be sequentially, alternately and/or simultaneously charged according to the invention. The state of charge of each battery may be independent of the others, and each battery may reach its full charge state independently.

The invention may also calculate the amount of power being used for charging and can limit the maximum power being drawn during charging to a predefined value. The invention is also most advantageous for use in power supplies, un-interruptible power supplies (UPS), CO detectors, and other power related applications where the intelligence of a programmable microcontroller is desired.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

The invention is a battery charger logic and control comprising a microcontroller, a switch mode power supply (SMPS) controller(s), an analog-to-digital converter (ADC) and an analog input multiplexer fabricated on an integrated circuit die which is contained in a single integrated circuit package. Another embodiment comprises the aforementioned functions fabricated on two integrated circuit dice interconnected in a single integrated circuit package. Still another embodiment comprises the aforementioned embodiments including a power converter on a third power transistor die or on the same die as the SMPS controller, all connected together within an integrated circuit package. The invention is used in conjunction with the power converter for charging a battery or a plurality of batteries. The invention is especially advantageous for easily implementing a battery charger design and reducing the component count thereof.

Referring now to the drawings, the details of preferred embodiments of the invention are schematically illustrated. Like elements in the drawings will be represented by like numbers, and similar elements will be represented by like numbers with a different lower case letter suffix.

Figure 1:
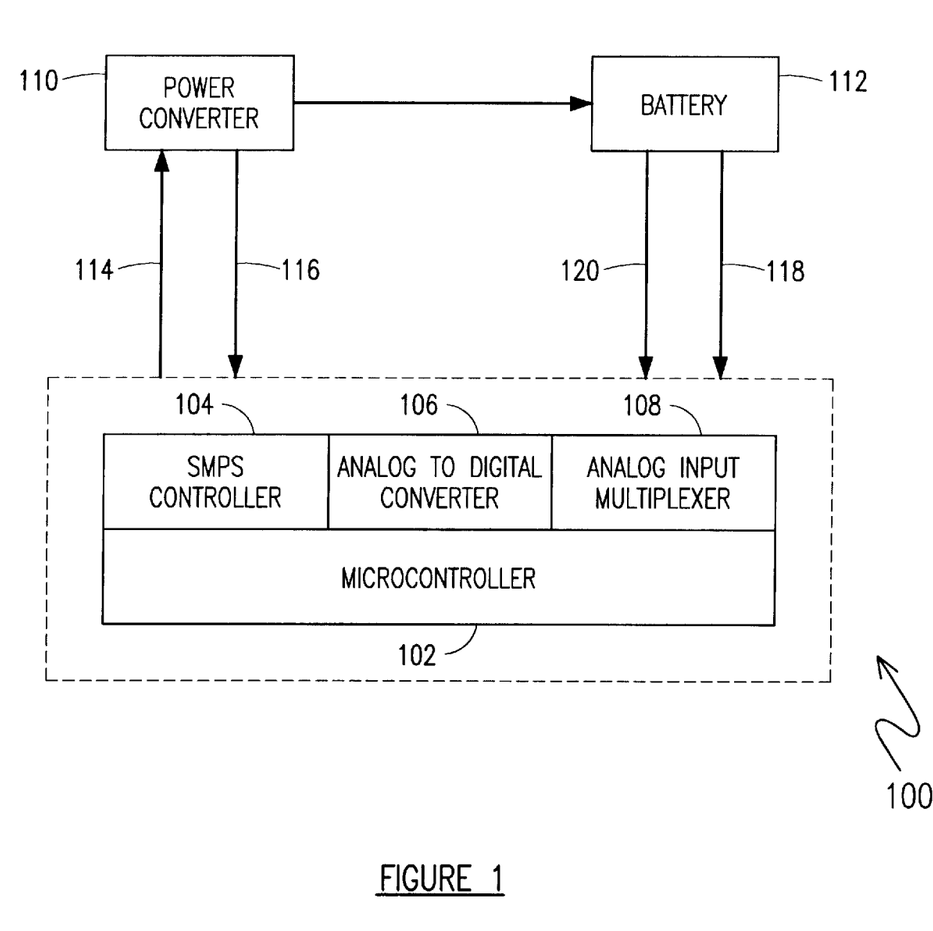
FIG. 1 is a schematic block diagram of a single battery charger having an integrated circuit package charger logic and control according to an embodiment of the invention.

Referring to FIG. 1, a schematic block diagram of a single battery charger having an integrated circuit package charger logic and control according to an embodiment of the invention is illustrated. The integrated circuit package charger logic and control is generally represented by the numeral 100 and comprises a microcontroller 102, a switch mode power supply (SMPS) controller 104, an analog-to-digital converter (ADC) 106, and an analog input multiplexer 108. A power converter 110 converts a power source (not illustrated) such as AC mains or a larger battery system such as found in an automobile to a voltage and current appropriate for charging a battery 112. The SMPS controller 104 of the charger logic and control 100 controls the power converter 110 and monitors battery 112 current and/or voltage during charging thereof.

The SMPS controller 104 has an output 114 which may have a repetition of on/off pulses used to drive the power transistor circuits (not illustrated) of the power converter 110, and inputs 116 which monitor the current and voltage being applied to the battery 112. The series of on/off pulses on the output 114 may be, for example but not limitation, pulse width, pulse position, or pulse skipping modulation.

Analog inputs 118 from the battery 112 are received by the analog input multiplexer 108 which multiplexes each signal on the inputs 118 to the input of the ADC 106. The ADC 106 converts each of the analog signals on the inputs 118 into a digital representation for use by the microcontroller 102. The analog inputs 118 are condition values from the battery 112 being charged and comprise, for example but not limitation, charging voltage and current, temperature, etc., of the battery 112. In addition, it is contemplated and within the scope of the invention that the microcontroller 102 may also read a digital battery identification value 120 so that an appropriate charging algorithm may be selected for the respective battery 112 being charged. This battery identification value may be coded into the case of the battery 112, and when this case is connected to the battery charger illustrated in FIG. 1, the battery type code is also connected to the microprocessor 102. Also contemplated and within the scope of the invention are digital battery status inputs, e.g., switched inputs that may represent high temperature, high pressure, low electrolyte, etc., of the battery 112.

Figure 2:
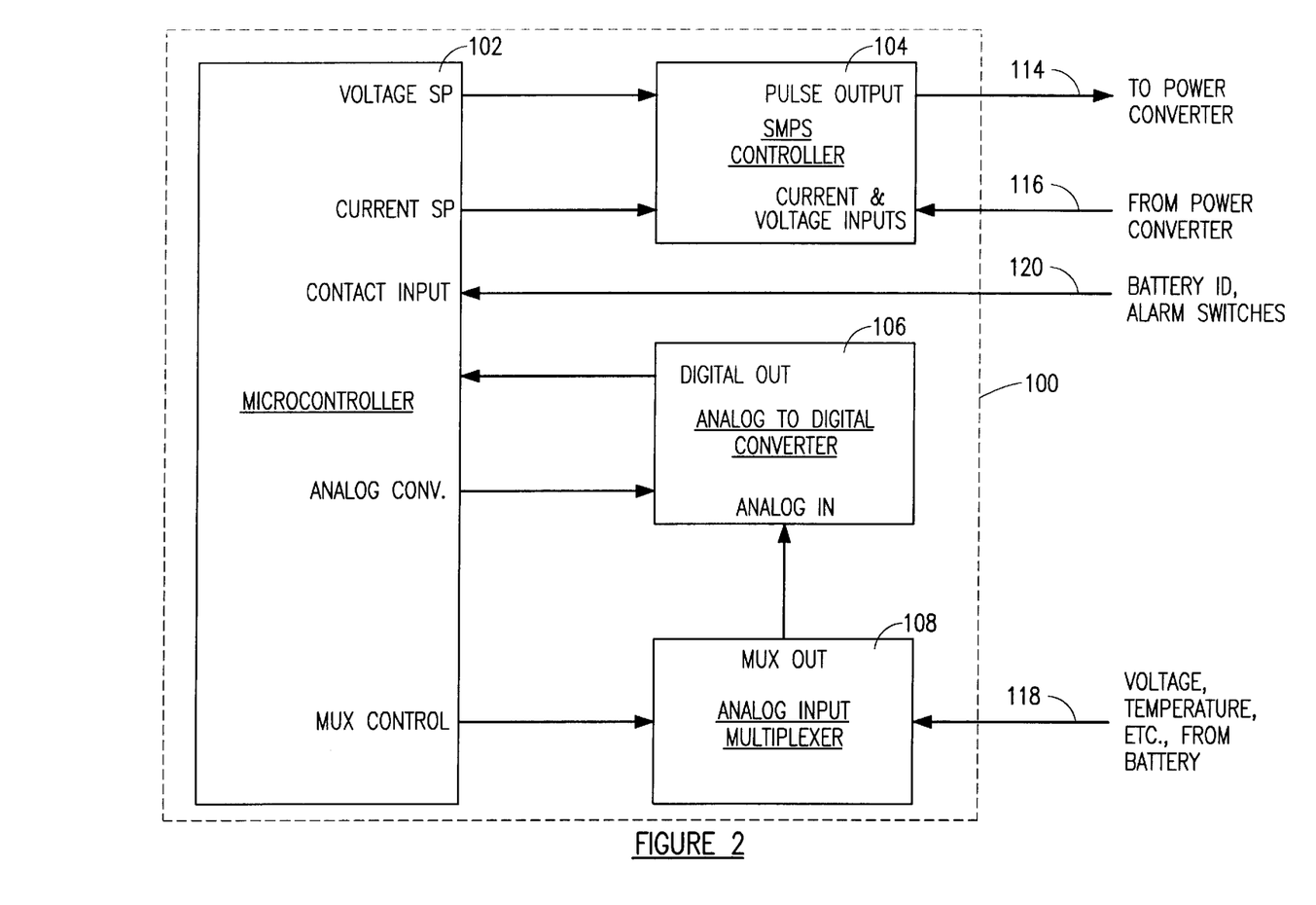
FIG. 2 is a schematic block diagram of the charger logic and control embodiment of FIG. 1.

Referring now to FIG. 2, a schematic block diagram of the charger logic and control embodiment of FIG. 1 is illustrated. The microcontroller 102 is programmed with a charging algorithm for each type of battery 112 that can be charged in the battery charger. The program of the microcontroller 102 causes a voltage setpoint and/or a current setpoint to be sent to the SMPS controller 104. The SMPS controller 104 uses the setpoint(s) as a target reference(s) when comparing current and voltage inputs 116 (parameter signals) from the power converter 110. The SMPS controller 104 has a pulsed output 114 which drives the power transistors in the power converter 110. For a closed loop charger system, when the current and/or voltage inputs 116 are less than the setpoint(s) from the microprocessor 102, the SMPS controller 104 increases the pulse repetition rate and/or duty cycle at the output 114 which causes the power converter 110 to correspondingly increase the associated voltage and/or current to the battery 112 being charged. On the other hand, when the current and/or voltage inputs 116 are greater than the setpoint(s) from the microprocessor 102, the SMPS controller 104 decreases the pulse repetition rate and/or duty cycle at the output 114 which causes the power converter 110 to correspondingly decrease the associated voltage and/or current to the battery 112 being charged. Thus when the SMPS controller 104 functions as a closed loop controller, it attempts to maintain the charging voltage and/or current of the battery 112 within a close approximation of the voltage and/or current setpoints generated by the microcontroller 102.

While the SMPS controller 102 preferably functions as an analog closed loop controller to maintain the voltage and/or current charging rates to the battery 112 in accordance with the setpoint(s), the microcontroller 102 also monitors condition values of the battery 112 being charged. These condition values are received at the analog inputs 118 and may be, for example but not limitation, charging voltage and current, temperature, etc. Digital values (high/low logic levels, switch contacts and the like) may be received at input(s) 120 for use by the microcontroller 102. Typical digital values at input 120 may be battery identification codes, presence of a battery to be charged, high temperature, low water or electrolyte level, high pressure and the like.

Figure 3:
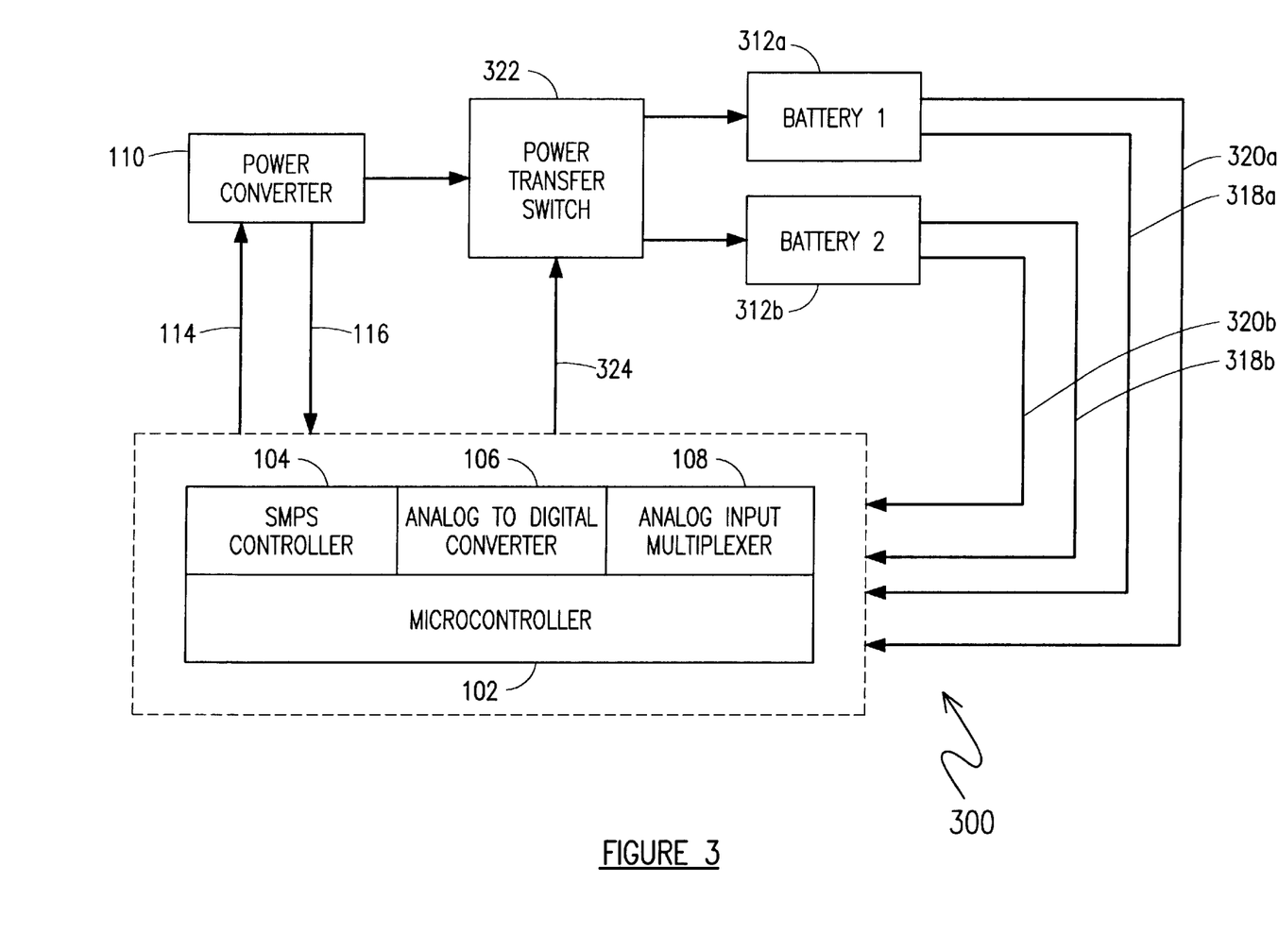
FIG. 3 is a schematic block diagram of a dual battery charger having an integrated circuit package charger logic and control according to another embodiment of the invention.

Referring to FIG. 3, a schematic block diagram of a dual battery charger having an integrated circuit package charger logic and control according to another embodiment of the invention is illustrated. The integrated circuit package dual charger logic and control is generally represented by the numeral 300 and comprises a microcontroller 102, a switch mode power supply (SMPS) controller 104, an analog-to-digital converter (ADC) 106, and an analog input multiplexer 108. A power converter 110 converts a power source (not illustrated) such as AC mains or a larger battery system such as found in an automobile to a voltage and current appropriate for charging batteries 312a and 312b. A power transfer switch 322 is used for switching the output of the power converter 110 to one of the two batteries 312a and 312b being charged. The power transfer switch 322 is controlled by the microcontroller 102 through output 324.

The SMPS controller 104 of the charger logic and control 300 controls the power converter 110 and monitors the selected battery current and/or voltage during charging thereof. Since the output of the power converter 110 is switched between the batteries 312a and 312b by the power transfer switch 322, the current and/or voltage monitored also changes. The charging priority and duration for each of the batteries 312a and 312b may be controlled by the microcontroller 102.

The SMPS controller 104 has an output 114 which may be a repetition of on/off pulses used to drive the power transistor circuits (not illustrated) of the power converter 110, and inputs 116 which monitor the current and voltage being applied to the selected battery 312a or 312b. The signal on the output 114 is a series of on/off pulses which may be, for example but not limitation, pulse width, pulse position, or pulse skipping modulation.

Analog inputs 318a and 318b from the battery 312a and 312b, respectively, are received by the analog input multiplexer 108 which multiplexes each signal on the inputs 318 to the input of the ADC 106. The ADC 106 converts each of the analog signals on the inputs 318 into digital representations for use by the microcontroller 102. The analog inputs 318a and 318b are condition values from the batteries 312a and 312b, respectively, and comprise, for example but not limitation, charging voltage and current, charged voltage, temperature, etc. In addition, it is contemplated and within the scope of the invention that the microcontroller 102 may also read digital battery identification values 320a and 320b so that appropriate charging algorithms may be selected for the respective batteries 312a and 312b being charged. The batteries 312a and 312b are not required to be the same capacity, voltage or chemistry type. These battery identification values may be coded into the cases of the batteries 312a and 312b, and when these cases are connected to the battery charger illustrated in FIG. 3, the battery type codes are also connected to the microprocessor 102. Also contemplated and within the scope of the invention are digital battery status inputs, e.g., switched inputs that may represent high temperature, high pressure, low electrolyte, etc., of the batteries 312a and 312b.

Figure 4:
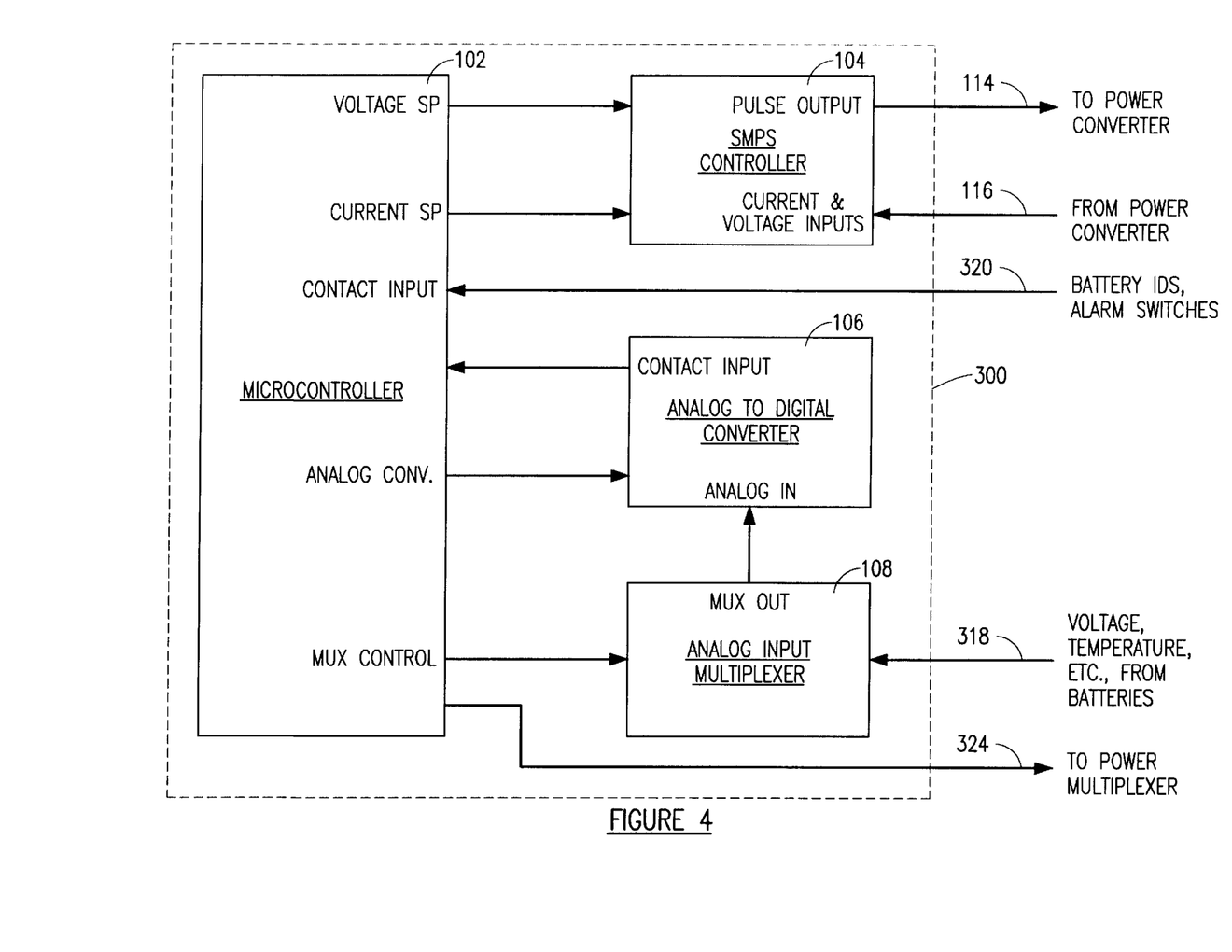
FIG. 4 is a schematic block diagram of the charger logic and control embodiment of FIG. 3.

Referring to FIG. 4, a schematic block diagram of the charger logic and control embodiment of FIG. 3 is illustrated. The microcontroller 102 is programmed with a charging algorithm for each type of battery 312 that can be charged in the battery charger. The program of the microcontroller 102 causes a voltage setpoint and/or a current setpoint to be sent to the SMPS controller 104. The SMPS controller 104 uses the setpoint(s) as a target reference(s) when comparing current and voltage inputs 116 (parameter signals) from the power converter 110. The SMPS controller 104 has a pulsed output 114 which drives the power transistors in the power converter 110. For a closed loop charger system, when the current and/or voltage inputs 116 are less than the setpoint(s) from the microprocessor 102, the SMPS controller 104 increases the pulse repetition rate and/or duty cycle at the output 114 which causes the power converter 110 to correspondingly increase the associated voltage and/or current to the battery 312 being charged. On the other hand, when the current and/or voltage inputs 116 are greater than the setpoint(s) from the microprocessor 102, the SMPS controller 104 decreases the pulse repetition rate and/or duty cycle at the output 114 which causes the power converter 110 to correspondingly decrease the associated voltage and/or current to the battery 312 being charged. Thus when the SMPS controller 104 functions as a closed loop controller, it attempts to maintain the charging voltage and/or current of the battery 312 within a close approximation of the voltage and/or current setpoints generated by the microcontroller 102.

While the SMPS controller 104 preferably functions as an analog closed loop controller to maintain the voltage and/or current charging rates to the selected battery 312 in accordance with the setpoint(s), the microcontroller 102 also can monitor condition values of both batteries 312a and 312b. These condition values are received at the analog inputs 318 and may be, for example but not limitation, charging voltage and current, temperature, etc. Digital values (high/low logic levels, switch contacts and the like) may be received at inputs 320 for use by the microcontroller 102. Typical digital values at inputs 320a and 320b may be battery identification codes, presence of a battery to be charged, high temperature, low water or electrolyte level, high pressure and the like.

Figure 5:
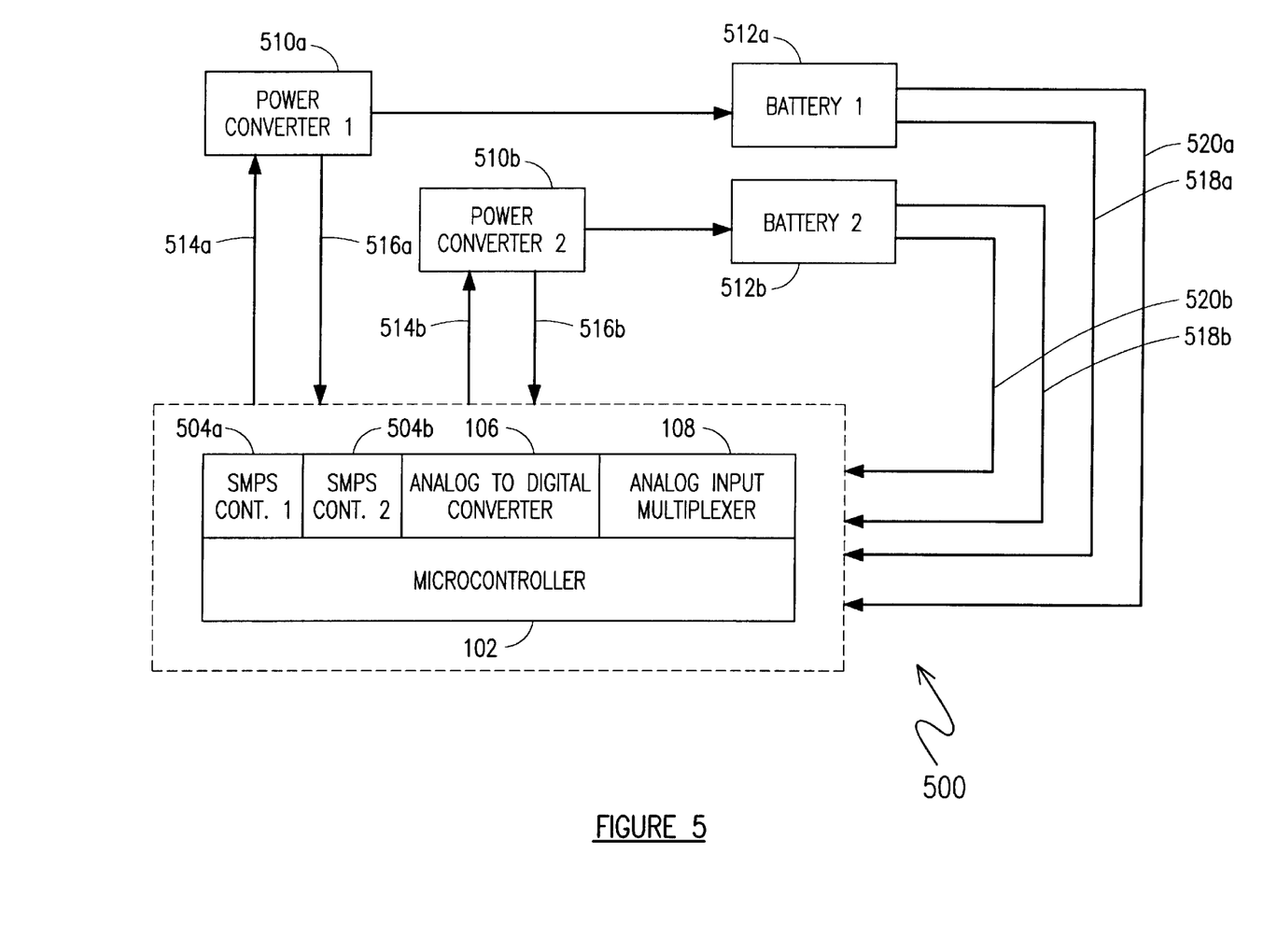
FIG. 5 is a schematic block diagram of a dual battery charger having an integrated circuit package charger logic and control according to yet another embodiment of the invention.

Referring to FIG. 5, a schematic block diagram of a simultaneous dual battery charger having an integrated circuit package charger logic and control according to yet another embodiment of the invention is illustrated. The integrated circuit package simultaneous dual charger logic and control is generally represented by the numeral 500 and comprises a microcontroller 102, two switch mode power supply (SMPS) controllers 504a and 504b, an analog-to-digital converter (ADC) 106, and an analog input multiplexer 108. Two power converters 510a and 510b convert a power source (not illustrated) such as AC mains or a larger battery system such as found in an automobile to a voltage and current appropriate for simultaneously charging batteries 512a and 512b. Charging of more than two batteries is also contemplated and within the spirit and intent of the invention. An individual SMPS and power converter for each battery is contemplated and with the scope of the invention.

The SMPS controllers 504a and 504b control the power converters 510a and 510b, respectively, and monitor the battery current and/or voltage during charging thereof. The SMPS controllers 504a and 504b have outputs 514a and 514b, respectively, each having a repetition of on/off pulses used to drive the power transistor circuits (not illustrated) of the power converters 510a and 510b, respectively, and inputs 516a and 516b which monitor the current and voltage being applied to the batteries 512a and 512b, respectively. The signals on the outputs 514a and 514b are a series of on/off pulses which may be, for example but not limitation, pulse width, pulse position, or pulse skipping modulation.

Analog inputs 518a and 518b from the batteries 512a and 512b, respectively, are received by the analog input multiplexer 108 which multiplexes each signal on the inputs 518 to the input of the ADC 106. The ADC 106 converts each of the analog signals on the inputs 518 into digital representations for use by the microcontroller 102. The analog inputs 518a and 518b are condition values from the batteries 512a and 512b, respectively, and comprise, for example but not limitation, charging voltage and current, charged voltage, temperature, etc. In addition, it is contemplated and within the scope of the invention that the microcontroller 102 may also read digital battery identification values 520a and 520b (FIG. 6) so that appropriate charging algorithms may be selected for the respective batteries 512a and 512b being charged. The batteries 512a and 512b are not required to be the same capacity, voltage or chemistry type. These battery identification values may be coded into the cases of the batteries 512a and 512b, and when these cases are connected to the battery charger illustrated in FIG. 5, the battery type codes are also connected to the microprocessor 102. Also contemplated and within the scope of the invention are digital battery status inputs, e.g., switched inputs that may represent high temperature, high pressure, low electrolyte, etc., of the batteries 512a and 512b.

Figure 6:
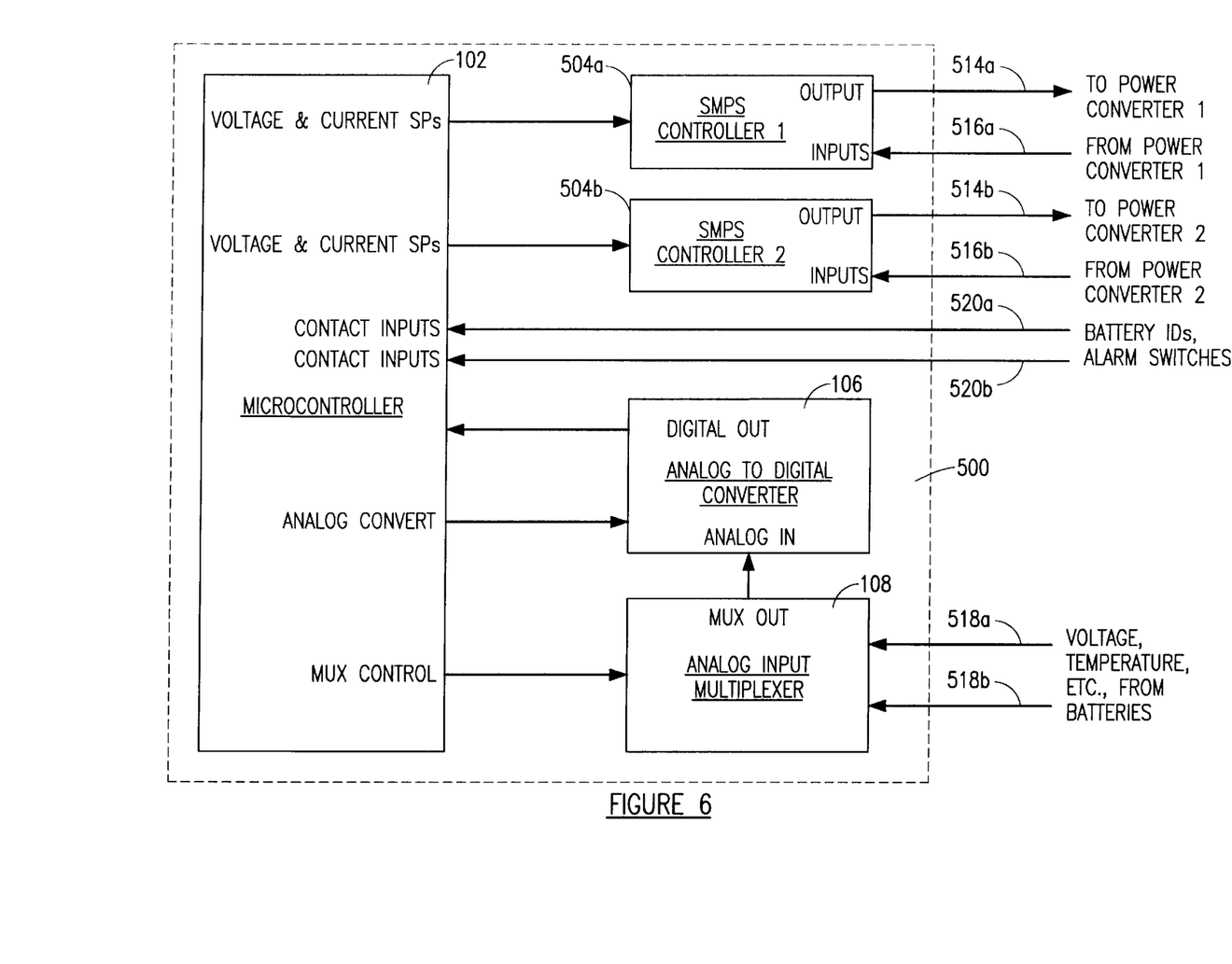
FIG. 6 is a schematic block diagram of the charger logic and control embodiment of FIG. 5.

Referring now to FIG. 6, a schematic block diagram of the charger logic and control embodiment of FIG. 5 is illustrated. The microcontroller 102 is programmed with a charging algorithm for each type of battery 512 that can be charged in the battery charger. The program of the microcontroller 102 causes a voltage setpoint and/or a current setpoint to be sent to the SMPS controllers 504a and 504b. The SMPS controllers 504a and 504b use the setpoints as target references when comparing current and voltage inputs 516a and 516b (parameter signals) from the power converters 510a and 510b. The SMPS controllers 504a and 504b have pulsed outputs 514a and 514b, respectively, which drive the power transistors in the power converters 510a and 510b. The SMPS controllers 502a and 502b preferably function as analog closed loop controllers to maintain the voltage and/or current charging rates to the respective batteries 512a and 512b in accordance with the respective setpoints.

The microcontroller 102 also can monitor condition values of the batteries 512a and 512b. These condition values are received at the analog inputs 518a and 518b and may be, for example but not limitation, charging voltage and current, temperature, etc. Digital values (high/low logic levels, switch contacts and the like) may be received at inputs 520a and 520b for use by the microcontroller 102. Typical digital values at inputs 520a and 520b may be battery identification codes, presence of a battery to be charged, high temperature, low water or electrolyte level, high pressure and the like.

It is contemplated and within the scope of the invention of the aforementioned embodiments illustrated in FIGS. 1–6, that the power converter(s) may be integrated with the SMPS controller(s) or the power converter(s) may be fabricated on its own semiconductor die and connected thereto in a single integrated circuit package.

Generally, for the embodiments of the invention described above, the ADC 106 in combination with the analog input multiplexer 108 has a plurality of analog inputs, and preferably produces a 10 bit analog to digital conversion resolution. A START bit may be set (Analog Conv. of FIG. 2) to start a conversion of the ADC 106. The microcontroller 102 also controls the input selection of the input multiplexer 108. During analog to digital conversion, the microcontroller 102 program can poll the ADC 106 to determine when it is finished converting the analog signal. When conversion is done, the ADC 106 will clear the START bit. It is also contemplated and within the scope of the invention that the ADC 106 may be setup to produce an interrupt once conversion is done. The voltage reference for the ADC 106 may be selected from an internal voltage reference module, or from an external voltage reference (not illustrated).

It is contemplated and within the scope of the present invention that any type of ADC that can be fabricated on an integrated circuit may be used for the ADC 106. In most applications, however, the analog signal range to be measured does not necessarily match the ADC 106 input range. In many of those application an op-amp circuit may be required to offset the signal and introduce the necessary gain, so that the ADC 106 may be used within its maximum input range. Preferably, the ADC 106 of the invention addresses this need by allowing the designer to match the ADC voltage measurement window to the range of the measured analog signal. This may be done by component selection for the ADC channels of interest, without the need of any external op-amps. As an example, a nickel cadmium battery charger requires the detection and measurement of a very small battery voltage slope reversal (−dV/dT) in order to determine whether a full charge condition has been reached. Likewise, in a Lithium Ion battery charger, detection and measurement of when the battery charging current falls below its full charge condition (e.g., 25 ma) will determine a full battery charge condition.

The SMPS controller 104 is adapted to drive the power converter 110 which, preferably, may be an external switch mode power supply circuit. The SMPS controller 104 uses either one or two feedback inputs, depending on the control mode selected. These two feedback inputs are current feedback and/or voltage feedback. The SMPS controller 104 preferably supports three modes: 1) constant voltage (CV), 2) constant current (CC), and 3) constant voltage with current compliance (CVCC).

In the CV mode, the SMPS controller 104 only requires a voltage feedback (VFB) at input 116 for control. The output 114 will generate pulses to drive the power converter 110 so that it maintains a constant voltage representation at the input 116. Voltage setpoint values may be selected by the program or firmware in the microcontroller 102.

In the CC mode, the SMPS controller 104 only requires current feedback (IFB) at input 116 for control. The output 114 will generate pulses to drive the power converter 110 so that it maintains a constant current representation at the input 116 (a voltage is generated across a low resistance in series with the battery charging current). Current setpoint values may be selected by the program or firmware in the microcontroller 102.

In the CVCC mode, the SMPS controller 104 requires both voltage (VFB) and current (IFB) feedback at the inputs 116 for control. The SMPS controller 104 will control in the CV mode as long as the current does not exceed the current setpoint If the current reaches the current setpoint, then the CC mode will take over. Both voltage and current setpoints are provided internally, and may be individually set by the program or firmware in the microcontroller 102.

The output 114 of the SMPS controller 110 can be configured to drive a power converter 110 having either buck or boost topologies, or to close the control loop when an external off-line switcher is used.

SMPS controller 104 output generates pulses adapted to drive the power converter 110 so that the controlled battery voltage or current matches the setpoint(s) from the microcontroller 102. The switching frequency of the output may be derived from the microcontroller 102 main oscillator. Using a 4 MHz internal oscillator mode, the switching frequency can be set, for example but not limitation, to 62.5 kHz, 125 kHz, or 250 kHz. The duty cycle of this output waveform preferably may be selected between 25%, 50%, 75%, and 93%. However, any duty cycle may be utilized depending on the application. Optimization of the frequency and duty cycle may be determined by the power device sizes, losses, and costs of the power switcher.

When the output 114 is configured for an external off-line switcher mode, the output 114 functions as a control error indicator. When either the battery voltage or current reaches the corresponding setpoint, the output 114 will go low. This output 114 signal can then be used to signal the external off-line switcher to slow down power conversion. The closed loop system, then, is operating as a CV, CC, or CVCC regulator based on the selected control mode.

A voltage reference module (not illustrated) may use the supply voltage which powers the charger logic and control 100 or an external voltage reference source may be utilized. The ADC 106 preferably uses a voltage reference module output for its operation.

Examples of which the invention is particularly well suited for are applications that involve voltage and (or) current regulation, as well as high resolution measurements for monitoring and control purposes. Some of those applications are battery chargers, un-interruptible power supply (UPS), power supplies, CO detectors, etc. Power management of the input power during charging of a plurality of batteries is contemplated and within the scope of the invention. A substantially discharged battery can pull a high charging current and charging a number of discharged batteries can place a heavy instantaneous (on startup) and continuous load on the primary power source. The invention can regulate the amount of primary power drawn from the power source by controlling the amount of charging voltage and/or current applied to the batteries being charged.

Examples of battery charger applications, according to the invention, are as follows: For Nicad and NiMH batteries, in smart battery chargers, depending on the battery chemistry, either a current source or a voltage source is required to charge the battery. For both Nicad and NiMH batteries, the charger normally provides a constant current. When charging begins, the charger supplies a high current to the battery. During this time, the charger is monitoring either (or both) the battery voltage, or (and) the battery temperature as a critical parameter to determine when the battery reaches a full charge condition. Once the fill charge condition is detected, the charger drops the charging current to a much lower value, called a trickle current. This trickle current is continuously applied to top off the battery to keep it at full charge until the battery is removed from the charger or until the charger power is removed. This example is just one of the commonly used methods. There are many other variations of charging algorithms in the industry. Charger design typically follows the charging algorithms for the batteries to be charged, which are normally specified by the battery manufacturer.

It is contemplated and within the scope of the invention that the SMPS controller 110 may control an external buck or boost power circuit with a current feedback. An internal amplifier (not illustrated) can directly amplify the external current sense resistor voltage, so an external op-amp circuit is not required to sense the charging current. Once the charging current is converted to voltage, it is controlled to track the internal programmable current set point reference. The firmware of the microcontroller 102 need only set the control mode to CC (Constant Current), and set the set-point to select the charging and trickle current values. This makes the design of the charging current source circuit very easy and with a minimum number of external components.

In many battery charger designs, an off-line switcher may be used for efficiency reasons, or to meet universal input voltage requirements. In this type of design, the SMPS controller 104 may be configured to produce an output that can be used as a feedback to the external off-line switching supply controller. In this mode, the SMPS controller 104 output will produce a low signal, if either the battery voltage or current reaches the desired set point. In many designs, where the secondary circuit must be electrically isolated from the AC mains, an opto-coupler preferably may be used to maintain circuit isolation. With a current limiting resistor in place, the SMPS controller 104 output can directly drive the opto-coupler's LED.

In the case of a Nicad battery, the charger control circuits must be able to measure a small drop in the battery voltage to detect a fill charge condition. In some charger designs, a voltage drop as small as 30 mV must be measured on top of a 7.2 V battery voltage. First of all, this voltage more than likely is outside the input range of commercially available A/D converters (e.g., 0 to 5 V). Secondly, the 30 mV change is just barely above the least significant bit change of an 8 bit ADC, if the input range of the ADC is 7.2 V. Therefore, most of the available low cost A/D converters in the market will require the use of an op-amp to introduce an offset and gain so as to bring the battery voltage of interest within the ADC's measurement range and resolution.

The ADC 106 of the invention is capable of making high-resolution measurements easily. Preferably, the ADC 106 may scale its input range for a full 10 bits of resolution, thus for a Nicad battery, the ADC 106 input range may be set to a 6 to 9 volt range. This gives the microcontroller 102 a 2.9 mV measurement resolution. The scaling of the ADC 106 input range may preferably be done by the proper selection of resistor values.

In the case of NiMH battery, a full charge condition is indicated by a rapid increase in the battery's temperature. The ADC 106 may measure the resistance value of a thermistor commonly used to measure battery temperatures. The measurement range is defined by selecting the proper resistor values, depending on the thermistor's resistance value.

Lithium Ion batteries have different charging requirements than either Nicad or NiMH. When charging begins, the charger must supply a constant current to the battery. In the mean time, the battery voltage is increasing toward its maximum voltage (i.e.: 4.1 V or 4.2 V for a single Li-ion cell, depending on the Li-ion type, specified by the manufacturer). Once the battery voltage reaches its maximum voltage, the charger must change the charging mode to a constant voltage source. The charging current will now decrease over time as the battery continues to charge. Eventually, the current will reach a small threshold value, i.e., 25 ma (normally specified by the battery manufacturer), at which point the battery is fully charged. In some cases, some battery manufacturers may say that after this current threshold is reached, charging in constant voltage mode may continue for an additional fixed amount of time to fully top off the battery. Once the battery is fully charged, the charger must completely turn off the charging current.

Due to the volatile nature of Li-Ion chemistries, a charging algorithm must closely follow what is specified by the battery manufacturer. Once the charging mode switches from constant current to constant voltage, the accuracy of the charging voltage is a very critical parameter for Li-ion batteries. Each Li-ion battery pack normally has a built-in protection circuit. If the voltage exceeds the battery's maximum charging voltage (specified by the battery pack manufacturer), the protection circuit may turn on to prevent any damage to the battery. If the battery protection circuit takes over, it completely disconnects the battery from the charger until the battery is disconnected therefrom, thus preventing the charger from further charging the battery. To prevent this failure condition during charging, many Li-Ion battery charger designs preferably will include a precision voltage reference, or a calibration step to make sure that the charging voltage is within the battery manufacturer's specifications.

The SMPS controller 104 uses the CVCC (constant voltage with current compliance) mode to control in either the constant voltage or constant current mode. At the beginning of the Li-ion battery charging, the constant current mode is active. Once the battery voltage reaches its maximum voltage, the constant voltage mode will automatically take over, allowing the charging current to decrease. This feature simplifies the charger's firmware algorithm, since the SMPS controller 104 automatically takes care of the most critical step in the Li-ion battery charging process.

The constant voltage mode requires a voltage feedback from the battery. A simple voltage divider resistor circuit may be used to provide this voltage feedback. To achieve the required voltage control accuracy, a stable and accurate power supply, or an external voltage reference is needed. Depending on the supply or reference voltage accuracy, a calibration step may not be necessary. However, a highly accurate voltage reference may be available or a small trimpot may be placed in the divider circuit to adjust the reference voltage during the calibration stage.

There are various charging algorithms that may be used to charge a lead-acid battery. These algorithms either require a constant voltage, a constant current, or constant voltage with current limit charging. In either case, the SMPS controller 104 may be configured to suit the requirements of the charging algorithm. The ADC 106 can be used to read the battery voltage (i.e.: 12 V, 24 V, etc.) by properly choosing the correct resistor values for the required voltage measurement window.

Figure 7:
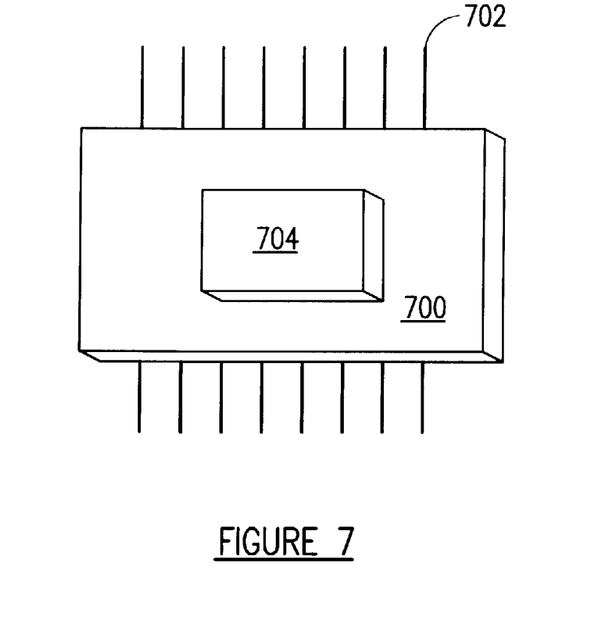
FIG. 7 is a schematic plan view of a single die integrated circuit package, according to an embodiment of the invention.

Referring to FIG. 7, a schematic plan view of a single die integrated circuit package of an embodiment of the invention is illustrated. An integrated circuit package represented by the numeral 700 comprises a single die 704 and leadframe connections 702. The die 704 may be connected to the leadframe 702 with or without encapsulation thereover, a printed wiring board (PWB) or substrate (not illustrated) by wire bonding, tape automated bonding, C4 and the like. Typical integrated circuit packages are for example but not limitation: Plastic Dual In-line Package (PDIP), Small Outline (SO), Shrink Small Outline Package (SSOP), Thin Shrink Small Outline Package (TSSOP), windowed Ceramic Dual In-line Package (CERDIP), Leadless Chip Carrier (LCC), Plastic Leaded Chip Carrier (PLCC), Plastic Quad Flatpack Package (PQFP), Thin Quad Flatpack Package (TQFP), Pin Grid Array (PGA), Ball Grid Array (BGA), TO-220, T0-247 and T0-263 (power surface mount package), or the die may remain unencapsulated on a tape film leadframe carrier, or as an unpackaged "flip-chip."

Figure 8:
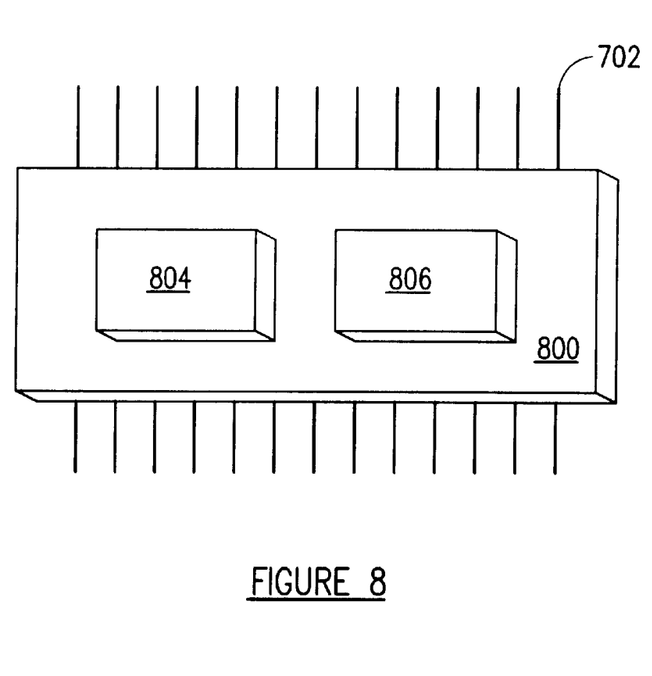
FIG. 8 is a schematic plan view of a dual die integrated circuit package, according to an embodiment of the invention.

Referring to FIG. 8, a schematic plan view of a two dice integrated circuit package of an embodiment of the invention is illustrated. A first die 804 and a second die 806 may be connected together within an integrated circuit package 800 by wire bonding, ball bump bonding, flipchip, C4 and the like. Input/Output (I/O) connections may be provided through a leadframe, integrated circuit package pins (PGA) or solder ball connections (BGA).

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for battery charger logic and control, said apparatus comprising:
   a microcontroller;
   a switch mode power supply controller;
   an analog to digital converter connected to said microcontroller, and
   an analog input multiplexer connected to said analog to digital converter, said analog input multiplexer having a plurality of analog inputs which are adapted to receive a plurality of condition values from a battery,
   wherein said microcontroller, said switch mode power supply controller, said analog to digital converter, and said analog input multiplexer are fabricated on a single integrated circuit die;
   said switch mode power supply controller having at least one analog input, at least one setpoint input, and an output adapted for controlling a power converter which charges the battery;
   said at least one setpoint input of said switch mode power supply controller receiving at least one setpoint from said microcontroller, and
   said at least one analog input of said switch mode power supply controller adapted to receive at least one parameter signal from the power converter.

2. The apparatus of claim 1, wherein the at least one parameter signal from the power converter is a signal proportional to the amount of current being drawn by the battery.

3. The apparatus of claim 1, wherein the at least one parameter signal from the power converter is a signal proportional to the amount of voltage being applied to the battery.

4. The apparatus of claim 1, wherein the at least one parameter signal from the power converter is a signal proportional to the amount of voltage being applied to the battery and another signal proportional to the amount of current being drawn by the battery.

5. The apparatus of claim 1, wherein the output of said switch mode power supply controller is a switched signal.

6. The apparatus of claim 5, wherein the switched signal from the output of said switch mode power supply controller comprises pulse-width modulation.

7. The apparatus of claim 5, wherein the switched signal from the output of said switch mode power supply controller comprises pulse-position modulation.

8. The apparatus of claim 5, wherein the switched signal from the output of said switch mode power supply controller comprises pulse-skipping modulation.

9. The apparatus of claim 1, wherein said switch mode power supply controller uses a constant voltage mode to maintain a constant voltage on the battery.

10. The apparatus of claim 1, wherein said switch mode power supply controller uses a constant current mode to maintain a constant current to the battery.

11. The apparatus of claim 1, wherein said switch mode power supply controller uses a constant voltage with current compliance mode to maintain a constant voltage on the battery unless a current parameter signal from the power converter exceeds a current setpoint from said microcontroller, then a constant current to the battery is maintained so as not to exceed the current setpoint.

12. The apparatus of claim 1, further comprising an output adapted for controlling a power transfer switch connected between the power converter, the battery and at least one other battery.

13. The apparatus of claim 1, further comprising an integrated circuit package enclosing said integrated circuit die.

14. The apparatus of claim 13, wherein the integrated circuit package is selected from a group consisting of plastic dual in-line package (PDIP), small outline (SO), shrink small outline package (SSOP), thin shrink small outline package (TSSOP), windowed ceramic dual in-line package (CERDIP), leadless chip carrier (LCC), plastic leaded chip carrier (PLCC), plastic quad flatpack package (PQFP), thin quad flatpack package (TQFP), pin grid array (PGA), ball grid array (BGA), TO-220, T0-247 and T0-263.

15. The apparatus of claim 1, wherein the power converter is fabricated on said single integrated circuit die.

16. The apparatus of claim 1, wherein said switch mode power supply controller is a plurality of switch mode power supply controllers.

17. The apparatus of claim 13, wherein the power converter is enclosed in said integrated circuit package.

18. An apparatus for battery charger logic and control, said apparatus comprising:
    a microcontroller;
    at least one switch mode power supply controller;
    an analog to digital converter connected to said microcontroller; and
    an analog input multiplexer connected to said analog to digital converter, said analog input multiplexer having a plurality of analog inputs which are adapted to receive a plurality of condition values from at least one battery,
    wherein said microcontroller, said at least one switch mode power supply controller, said analog to digital converter, and said analog input multiplexer are fabricated on a single integrated circuit die;
    said at least one switch mode power supply controller having at least one analog input, at least one setpoint input, and at least one output adapted for controlling at least one power converter which charges the at least one battery;
    said at least one setpoint input of said at least one switch mode power supply controller receiving at least one setpoint from said microcontroller, and
    said at least one analog input of said at least one switch mode power supply controller adapted to receive at least one parameter signal from the at least one power converter.

19. The apparatus of claim 18, wherein the at least one power converter is fabricated on said single integrated circuit die.

20. An apparatus for battery charger logic and control, said apparatus comprising:
    a microcontroller;
    a plurality of switch mode power supply controllers;
    an analog to digital converter connected to said microcontroller; and an analog input multiplexer connected to said analog to digital converter, said analog input multiplexer having a plurality of analog inputs which are adapted to receive a plurality of condition values from a plurality of batteries, wherein said microcontroller is fabricated on a first integrated circuit die, and said plurality of switch mode power supply controllers, said analog to digital converter, and said analog input multiplexer are fabricated on a second integrated circuit die;

said plurality of switch mode power supply controllers having a plurality of analog inputs, a plurality of setpoint inputs, and a plurality of outputs adapted for controlling a plurality of power converters which charge the plurality of batteries;

said plurality of setpoint inputs of said plurality of switch mode power supply controllers receiving a plurality of setpoints from said microcontroller;

said plurality of analog inputs of said plurality of switch mode power supply controllers adapted to receive a plurality of parameter signals from the plurality of power converters; and said first and second integrated circuit dice having connections therebetween and being encapsulated in an integrated circuit package.

21. The apparatus of claim 20, wherein the plurality of power converters are fabricated on said second integrated circuit die.

22. A system for charging at least one battery, said system comprising:

a microcontroller;

at least one switch mode power supply controller;

an analog to digital converter connected to said microcontroller;

an analog input multiplexer connected to said analog to digital converter, said analog input multiplexer having a plurality of analog inputs which are adapted to receive a plurality of condition values from at least one battery, and at least one power converter adapted for connection to the at least one battery;

wherein said microcontroller, said at least one switch mode power supply controller, said analog to digital converter, and said analog input multiplexer are fabricated on a single integrated circuit die;

said at least one switch mode power supply controller having at least one analog input, at least one setpoint input, and at least one output for controlling said at least one power converter which charges the at least one battery;

said at least one setpoint input of said at least one switch mode power supply controller receiving at least one setpoint from said microcontroller; and said at least one analog input of said at least one switch mode power supply controller receives at least one parameter signal from the at least one power converter.

23. The system of claim 22, wherein the at least one power converter is fabricated on said single integrated circuit die.

24. The system of claim 22, further comprising an integrated circuit package enclosing said single integrated circuit die.

25. The system of claim 22, further comprising an integrated circuit package enclosing said single integrated circuit die and the at least one power converter.

26. The system of claim 23, further comprising an integrated circuit package enclosing said single integrated circuit die.

27. A system for charging a plurality of batteries, said system comprising:

a microcontroller;

a plurality of switch mode power supply controllers;

an analog to digital converter connected to said microcontroller; and an analog input multiplexer connected to said analog to digital converter, said analog input multiplexer having a plurality of analog inputs which are adapted to receive a plurality of condition values from a plurality of batteries; and a plurality of power converters adapted for connection to the plurality of batteries;

wherein said microcontroller is fabricated on a first integrated circuit die, and said plurality of switch mode power supply controllers, said analog to digital converter, and said analog input multiplexer are fabricated on a second integrated circuit die;

said plurality of switch mode power supply controllers having a plurality of analog inputs, a plurality of setpoint inputs, and a plurality of outputs for controlling the plurality of power converters which charge the plurality of batteries;

said plurality of setpoint inputs of said plurality of switch mode power supply controllers receiving a plurality of setpoints from said microcontroller;

said plurality of analog inputs of said plurality of switch mode power supply controllers receiving a plurality of parameter signals from the plurality of power converters; and said first and second integrated circuit dice having connections therebetween and being encapsulated in an integrated circuit package.

28. The system of claim 27, wherein the plurality of power converters are fabricated on said second integrated circuit die.

29. The system of claim 27, further comprising the plurality of power converters being encapsulated in said integrated circuit package.

* * * * *